(12) United States Patent
Kuper et al.

(10) Patent No.: US 12,233,824 B2
(45) Date of Patent: Feb. 25, 2025

(54) CAR WASH MITTER AND RELATED METHOD OF USE

(71) Applicant: VQ, Inc., Holland, MI (US)

(72) Inventors: Andrew J. Kuper, Holland, MI (US); Andrew S. VanWylen, Holland, MI (US); Austin N. Jacobs, Allendale, MI (US)

(73) Assignee: VQ, Inc., Holland, MI (US)

( * ) Notice: Subject to any disclaimer, the term of this patent is extended or adjusted under 35 U.S.C. 154(b) by 0 days.

(21) Appl. No.: 18/633,946

(22) Filed: Apr. 12, 2024

(65) Prior Publication Data

US 2024/0262320 A1  Aug. 8, 2024

Related U.S. Application Data

(63) Continuation of application No. 17/369,456, filed on Jul. 7, 2021, now Pat. No. 11,981,298.

(51) Int. Cl.
*B60S 3/04* (2006.01)
*A46B 9/00* (2006.01)
*A46B 9/02* (2006.01)
*A46B 13/02* (2006.01)

(52) U.S. Cl.
CPC .............. *B60S 3/04* (2013.01); *A46B 9/005* (2013.01); *A46B 9/028* (2013.01); *A46B 13/02* (2013.01); *A46B 2200/3046* (2013.01)

(58) Field of Classification Search
CPC . A46B 2200/3046; A46B 13/02; A46B 9/028; A46B 9/005; B60S 3/04; Y10S 15/02
USPC .................. 15/DIG. 2, 53.3, 97.3, 53.2
See application file for complete search history.

(56) References Cited

U.S. PATENT DOCUMENTS

| | | | |
|---|---|---|---|
| 5,259,084 A | 11/1993 | Kaady et al. | |
| 7,051,396 B2* | 5/2006 | Levesque | A46D 1/0253 15/230.16 |
| 2005/0268412 A1 | 12/2005 | Pecora | |
| 2005/0268413 A1 | 12/2005 | Pecora | |
| 2011/0138558 A1 | 6/2011 | Favaqgrossa | |
| 2011/0138559 A1* | 6/2011 | Plotka | A61C 17/22 15/167.1 |

* cited by examiner

*Primary Examiner* — Katina N. Henson
(74) *Attorney, Agent, or Firm* — Warner Norcross + Judd LLP (57) ABSTRACT

An overhead vehicle wash mitter apparatus is provided. A mitter curtain can include multiple mitters that sway above a vehicle pathway as a vehicle travels along the pathway. Each mitter can include an upper end and a lower end closer to the vehicle pathway, a sheath defining an interior tube and an exterior surface that engages a vehicle surface, and a pad in the sheath. The pad can press outward on the sheath so that the sheath attains a first thickness, which can be at least ½ inch, at least 1 inch, at least 1½ inch or more, so the sheath is impaired from entering between a wiper and a surface of the vehicle, such as a window. Accordingly, damage to the wiper of the vehicle is prevented when the mitter engages the surface and the wiper. A related method of use is provided.

20 Claims, 8 Drawing Sheets

CAR WASH MITTER AND RELATED METHOD OF USE

BACKGROUND OF THE INVENTION

The present invention relates to vehicle washing equipment, and more particularly to mitters used to clean surfaces of a vehicle passing through an automated vehicle wash.

There is a variety of automatic vehicle wash systems presently available. Many of these systems include automatically controlled equipment to wash, wax, polish and/or buff the various surfaces of the vehicle. Some of this equipment is in the form of a drum biased toward the vehicle. The drum rotates to cause finishing elements on the drum to wash, dry, polish or otherwise contact the vehicle's surface. Other equipment includes long, hanging finishing elements that dangle and drag over a vehicle as it passes the equipment. Most finishing elements are in the form of long cloth elements. These elements either spin or rotate with the drum, or hang and move over the vehicles surfaces as the vehicle passes the equipment.

An issue with hanging cloth elements is that they present issues with vehicles that have rear wipers, such as most common SUVs, station wagons and hatchbacks. In particular, the cloth elements are typically thin and move about a lot. They can therefore wiggle their way between a wiper and a window as the vehicle is engaged by the cloth elements. As a result, the cloth elements become stuck between the wiper and the window, so that when the vehicle continues past the cloth elements, and those cloth elements remain stationary, the elements will pull on the wiper and potentially damage it by bending or tearing the wiper off the vehicle. In turn, this typically results in the wash owner having to pay for the damage to the vehicle. Over the course of a year, the number of damaged rear wiper claims can mount, increasing the overall cost of operating the car wash, and potentially damaging the reputation of the wash.

Accordingly, there remains room for improvement with finishing elements that safely engage a vehicle for washing, waxing, buffing, drying and/or polishing as they pass through an automated wash system.

SUMMARY OF THE INVENTION

An overhead vehicle wash mitter apparatus is provided. A mitter curtain includes multiple mitters that move above a vehicle pathway as a vehicle travels thereon. Each mitter can include an upper end and a lower end closer to the vehicle pathway, a sheath defining an interior tube, an exterior surface that engages a vehicle surface, and a pad in the sheath. The pad can press outward on the sheath so that the sheath attains a first thickness, which can be at least ½ inch, at least 1 inch, at least 1½ inch or more, so the sheath is impaired from entering between a wiper and a surface of the vehicle, such as a window. Accordingly, damage to the wiper of the vehicle is prevented when the mitter engages the surface and the wiper.

In one embodiment, the mitter is a vertically suspended swaying mitter that sways side to side, across the vehicle path, in directions that traverse and/or are generally perpendicular to the longitudinal axis of the lane.

In another embodiment, the sheath exerts a force on the pad inside the interior tube so that at least a portion of the pad is compressed and the sheath is stretched taut over the pad. Where stretched taut, the sheath can include one or more bulges that include an enhanced thickness that is impaired from entering an interface or crevice between a vehicle surface and a wiper.

In still another embodiment, the sheath includes multiple seams transverse to a longitudinal axis of the sheath. The pad can be compressed more adjacent the seams so that the sheath has a second thickness adjacent the seams. That second thickness can be less than the first thickness so that the mitter undulates in thickness extending upward from a lower end of the sheath.

In even another embodiment, the elongated pad can extend upward from the lower end in the interior tube and terminates at a first pad end. The first pad end can be disposed at least two feet away from the upper end of the sheath. The sheath can have no elongated pad inside the interior tube between the first pad end and the first end of the sheath, in a padless region.

In a further embodiment, the elongated pad includes multiple individual segments distributed along a length of the sheath extending away from the lower end. Each segment can be a foam pad having a thickness of about 1 inch to about 3 inches. In some cases, the elongated pad can be a continuous foam pad extending along a length of the sheath away from the second end, and can have a thickness of about 1 inch to about 3 inches.

In a further embodiment, a method is provided. The method can include providing a mitter curtain with mitters having a sheath defining an interior tube, an exterior surface and a pad inside the interior tube, the sheath exerting a compressive force on the pad inside the interior tube, with the sheath having a first thickness between a first surface and a second surface; swaying the mitter curtain transversely across and above the vehicle pathway such that a downward extending mitter engages a rear window of a vehicle adjacent a wiper of the vehicle, the wiper in contact with the rear window, the mitter moving along an interface between the wiper and the rear window, the first thickness being too great for the mitter to breach the interface and urge the wiper out of contact with the rear window as the mitter moves, whereby damage to the wiper of the vehicle is prevented when the mitter curtain engages the rear window and the wiper as the vehicle travels along the vehicle pathway.

In still a further embodiment, the method can include moving a sheath having multiple seams transverse to a longitudinal axis of the sheath. The elongated pad can be compressed more adjacent the seams so that multiple bulges is formed along the sheath. Those bulges can engage at least one of the rear window and the wiper.

In still a further embodiment, the method can include moving the multiple bulges along the sheath over the rear window and the wiper. The individual bulges can flex relative to one another to allow the overall mitter to conform to the contours of the vehicle and the rear window.

The current embodiments provide an apparatus and method for simple and efficient use of mitters in an automated vehicle wash environment. With the enhanced thickness of the novel mitters, the structure of the mitter impairs damage to vehicles, and in particular, can reduce the likelihood that a mitter fits into a crevice or small corner area between two parts of a vehicle to cause movement, damage or undesirable effects on the parts during a washing event. Where the vehicle includes a window and a wiper, the mitter can be sufficiently thick that it cannot physically enter the crevice between the window and wiper to eventually separate those components. In turn, the mitter will not pull the wiper from the window, and otherwise damage or malign the wiper. This in turn can reduce the incidence of wiper damage in automated vehicle washes, which can improve profitability and reputation of the same.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
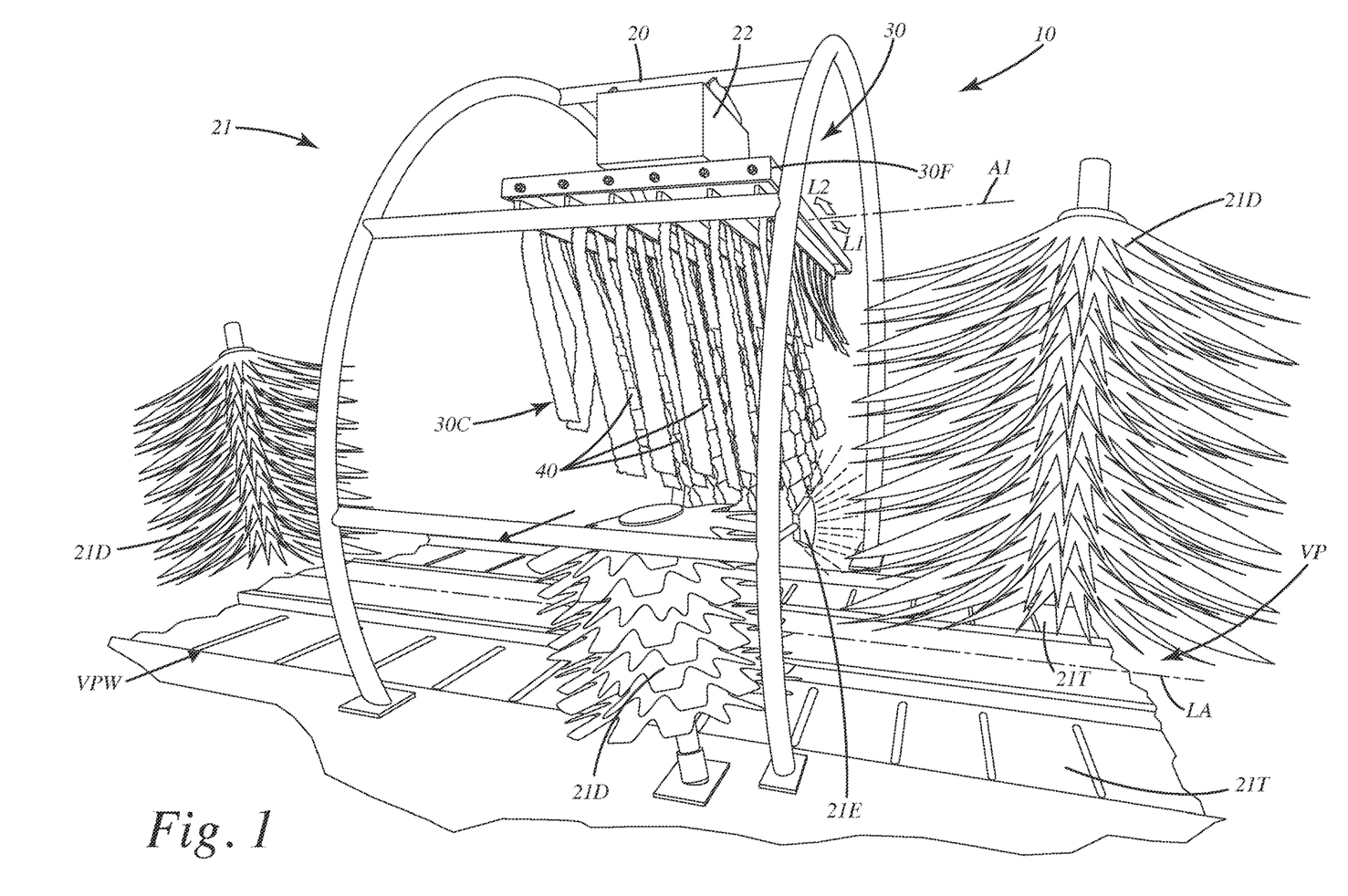
FIG. 1 is a perspective view of a current embodiment of an overhead vehicle wash mitter apparatus disposed in a vehicle wash along a vehicle pathway.
Figure 2:
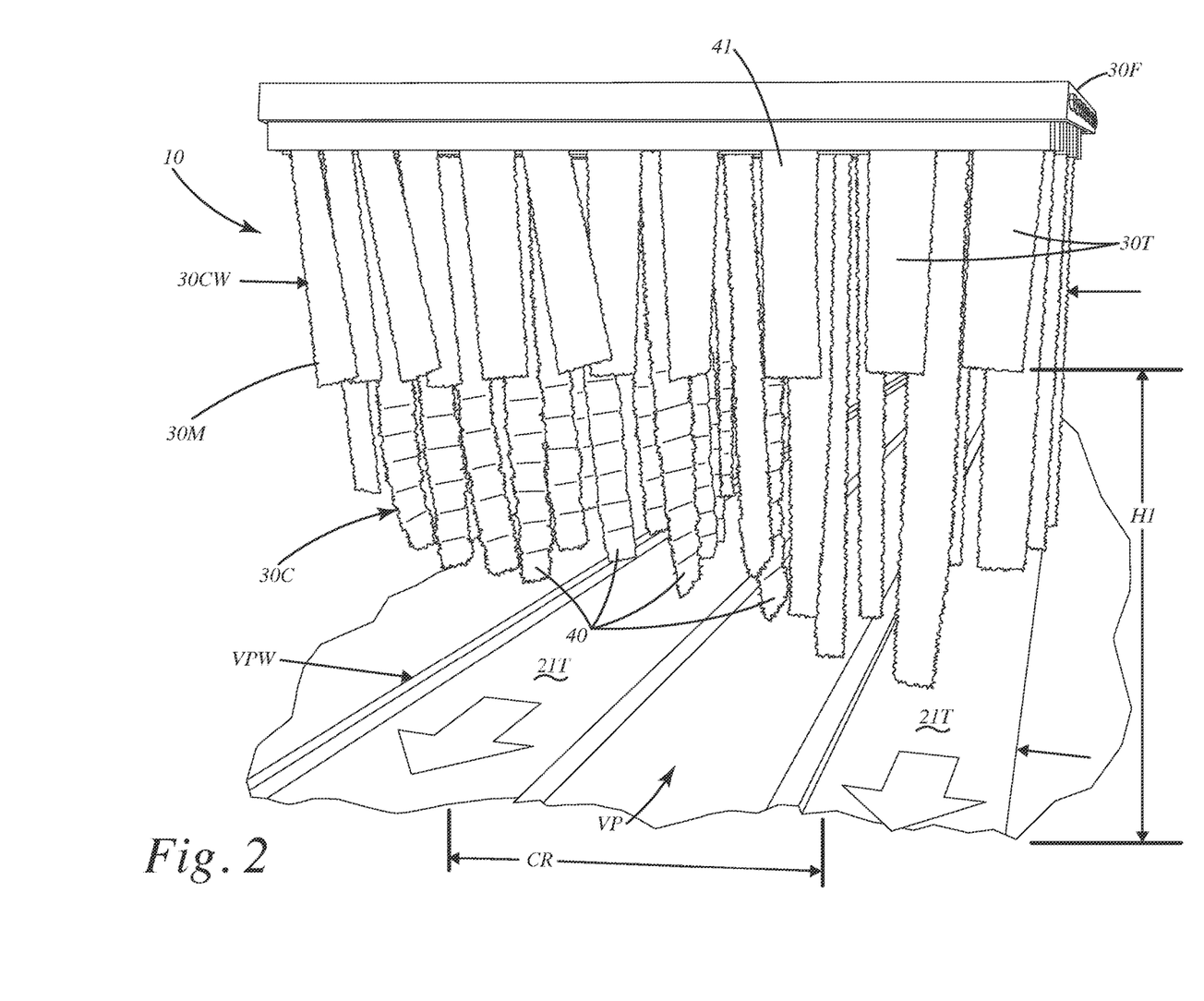
FIG. 2 is a second perspective view thereof.
Figure 3:
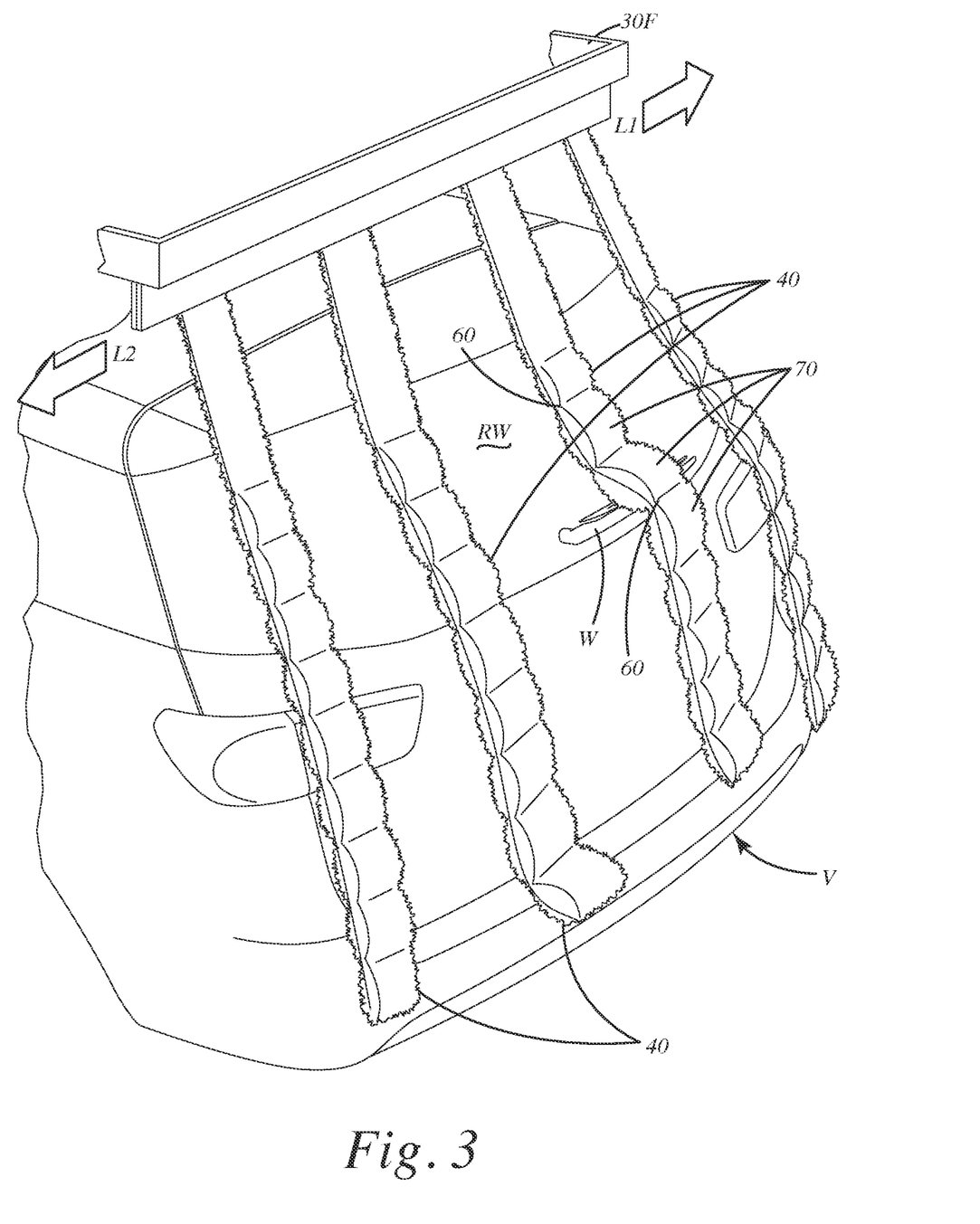
FIG. 3 is a perspective view of individual mitters engaging a vehicle surface and a wiper of the vehicle, but unable to enter a crevice between the surface and the wiper.
Figure 4:
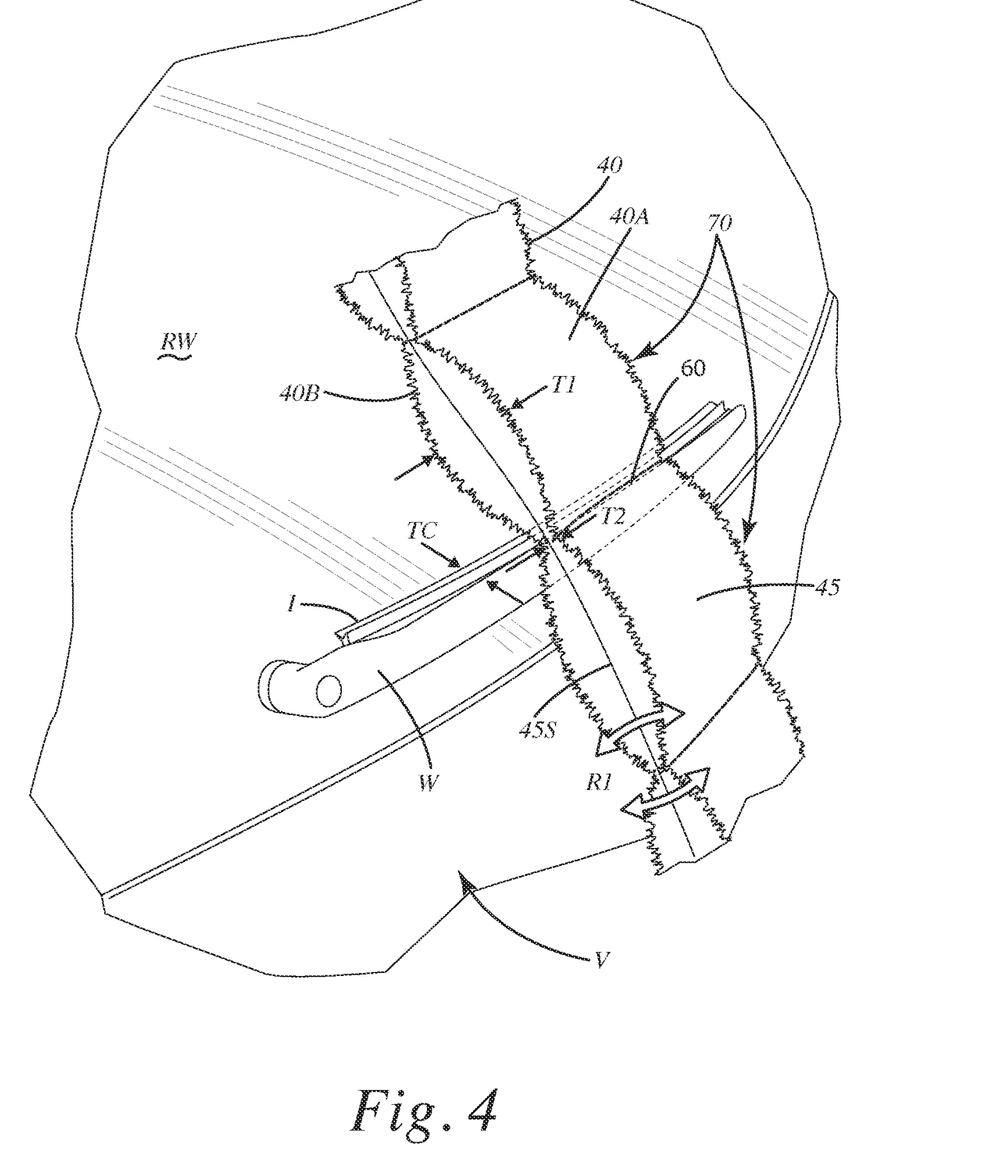
FIG. 4 is a close up perspective view of a mitter being impaired from entering the crevice or interface between the wiper and the surface due to a predetermined thickness of the mitter.
Figure 5:
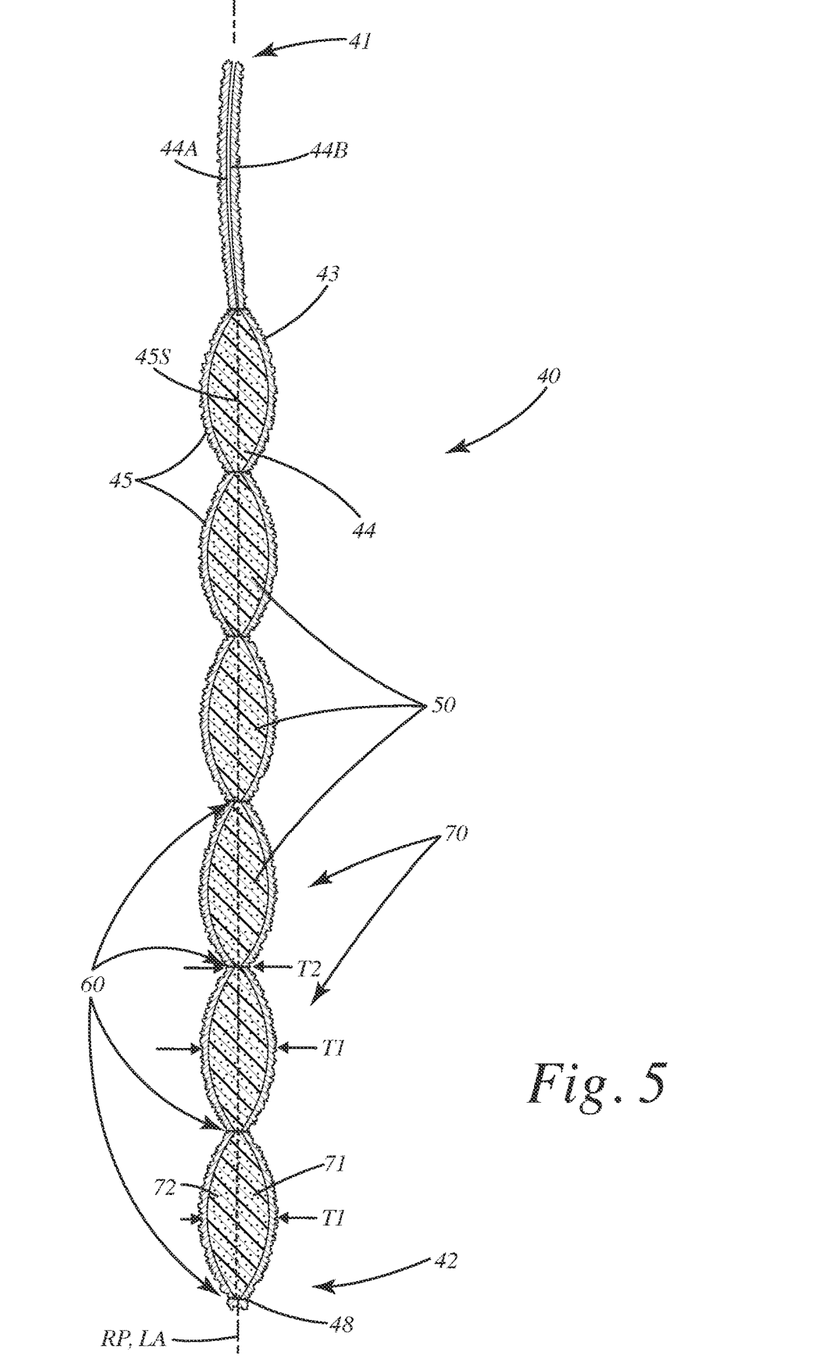
FIG. 5 is a section view of an individual mitter.
Figure 6:
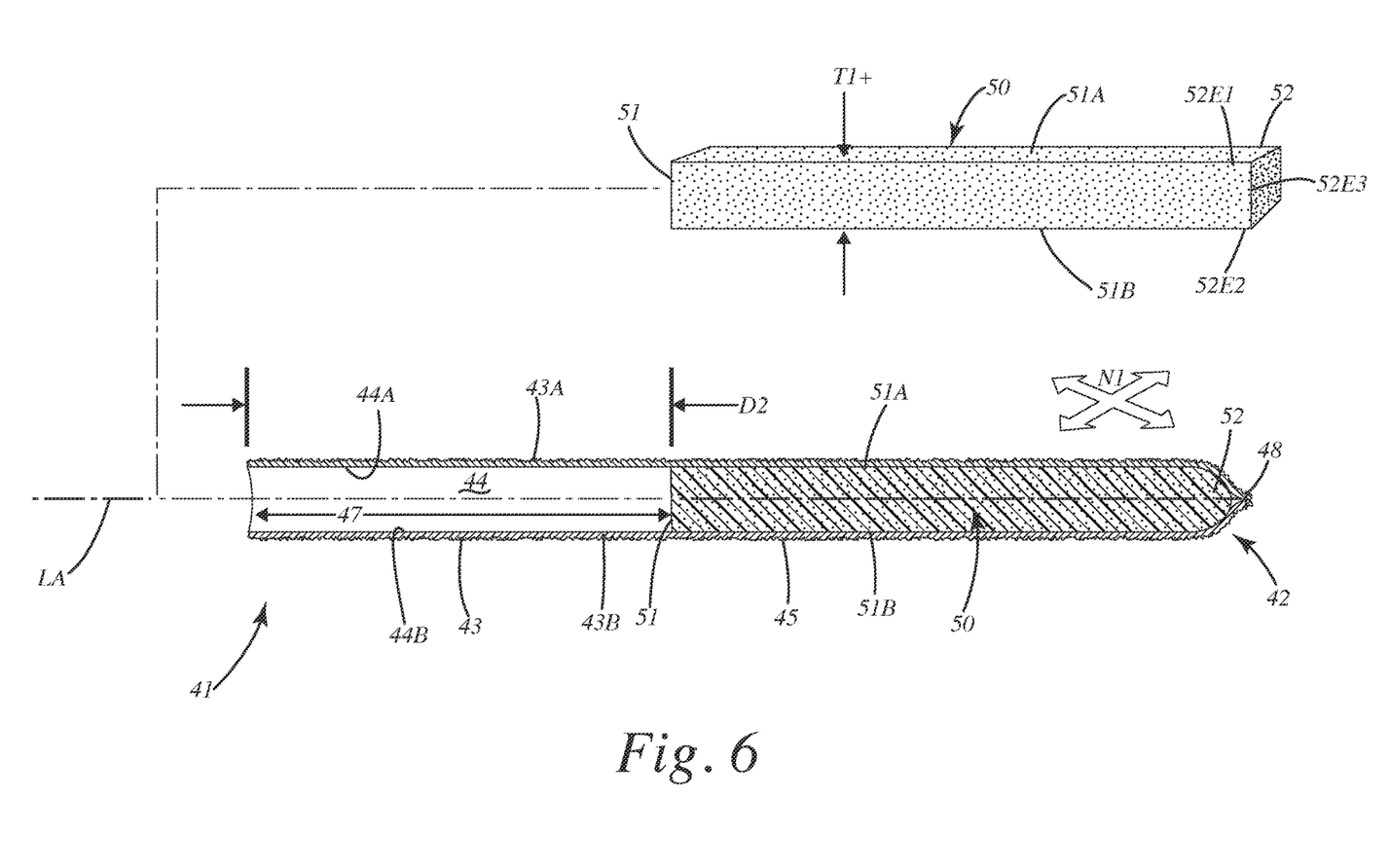
FIG. 6 is a section view of a pad being assembled relative to a sheath of an individual mitter.

A current embodiment of the preparation station of a vehicle wash mitter apparatus is shown in FIGS. 1-8 and generally designated 10. The mitter apparatus can include a support frame 20 to which a mitter unit 30 is joined. Mitter unit 30 can include a mitter curtain 30C joined with a mitter frame 30F. The mitter curtain 30C and mitter frame 30F can be movable relative to the support frame 20. The mitter curtain can include multiple individual mitters 40, with each mitter 40 optionally dangling vertically downward and able to sway to and fro with the other mitters transversely across and above the vehicle pathway VP. Each individual mitter 40 can include a first end and/or upper end 41 and a second and/or lower end 42 as shown in FIGS. 5-6. The lower end can be closer to the vehicle pathway VP than the first end as shown in FIG. 2. Each mitter can include a sheath 43 defining an interior tube 44 and an exterior surface 45 that is configured to engage a vehicle surface. The sheath 43 can house and enclose a pad 50 inside it. The pad 50 can press outward on the sheath 43 so the sheath attains a first thickness T1. This thickness T1 can be sufficiently greater than a depth or thickness of a crevice TC (FIG. 4) adjacent a wiper W of a vehicle V that travels on the vehicle pathway VP during a washing operation or other operation in the vehicle wash system. The thickness of the individual mitters 40 in the region of the mitters that contact and otherwise engage the wiper W and vehicle surface RW, which optionally can be a rear window of the vehicle, is such that each mitter and its parts can safely engage the wiper and rear window RW without breaching an interface I between the wiper W and the rear window RW or other vehicle surface. Accordingly, the mitters are impaired from entering the space between the wiper W, for example the wiper blade, and the vehicle surface, for example the rear window, which the mitter engages. As a result, excessive movement, displacement and/or damage to the wiper of the vehicle relative to the window is prevented when the mitter curtain 30 and individual mitters 40 engage the vehicle surface and the wiper as the vehicle travels along the vehicle pathway.

The construction of the vehicle wash mitter apparatus 10 will now be described in more detail with reference to FIGS. 1-4. As noted above, the vehicle wash mitter apparatus 10 can include a support frame 20. The support frame 20 can be in the form of a set of aesthetically arched tubes that extend upwardly and over at least a portion of the pathway VP on which the vehicle V travels through the automated vehicle wash system 21. The mitter apparatus 10 can be configured to wash, clean, gently scrub, or otherwise treat a vehicle V traveling on the vehicle path VP. The mitter apparatus 10 can be set up at various locations or portions of the wash system 21 along vehicle path VP. As illustrated in FIG. 1, the mitter apparatus 10 optionally can be supported by the support frame 20, stationed adjacent and/or between multiple rotating drum elements 21D that are movably disposed relative to the vehicle path VP. The mitter apparatus 10 also can be aligned with conveyor tracks 21T that can move a vehicle along the vehicle path VP through the mitter apparatus 10 and/or the portions of the vehicle wash system 21. Further optionally, other equipment 21E can administer quantities of water, liquid cleaners and/or other chemicals to the vehicle during a washing or treatment operation. The vehicle wash system 21 can be automated and can include additional spraying apparatus, scrubbers, dryers and the like. Of course, although described in conjunction with an automated vehicle wash system, the mitter apparatus 10 can be used in conjunction with other types of wash systems depending on the application.

Returning to FIG. 1, the support frame 20 can be positioned proximal the pathway VP, optionally extending horizontally across at least a portion of the pathway VP so that the mitter curtain 30C is located overhead, generally vertically above the pathway VP. The support frame 20 can be in the form of a partial arch. Of course, if desired, it can be in the form of a full arch. Further, although shown in the form of a semicircular arch attached to a linear post, the arch can be of other geometric shapes, for example, it can be partially triangular, elliptical, square, octagonal, hexagonal or of other configurations. The support frame 20 can be made from solid or hollow tubing of a sufficient rigidity and strength to support the mitter curtain 30C. The dimensions of the support frame 20 can also be such that it can hold the mitter curtain 30C above a variety of different sized vehicles ranging from cars, to light and heavy trucks or semis, depending on the particular vehicle wash application.

As further illustrated in FIG. 2, the support frame 20 can support a motor 22. The motor 22 can be bolted welded or otherwise fixed to the support frame. The motor 22 can be an electric motor, a hydraulic motor, a pneumatic motor or any other type of movement mechanism. This motor 22 can be further attached to a mitter frame 30F. This mitter frame 30F can be moved along one or more axes relative to the motor and to the vehicle pathway VP. For example, the mitter frame 30F can be in the form of a box to which multiple mitters 40 in the mitter curtain 30C are connected. These connections can be maintained via a simple clamp mechanism or via a system of pins, rods and/or brackets. With these connections, each individual mitter can dangle generally vertically downward from the mitter frame 30F toward the vertical path VP. The individual mitters in the mitter curtain 30C can overlay a substantial portion of the vehicle path VP so that when a vehicle moves under or through the mitter curtain and individual mitters, those mitters can engage the surfaces of the vehicle as described further below to impart a washing, buffing, waxing, treatment application or other engagement with the vehicle surfaces.

The motor 22 can be connected to a power source that powers the motor so that it can translate movement to the mitter frame 30F. The mitter frame 30F itself can move laterally in directions L1 and L2 along an axis AI that is transverse, for example perpendicular, to the longitudinal axis LA of the vehicle path VP. Thus, the frame and the associated mitter curtain 30C can move laterally first in direction L1 and then reverse direction to move in direction L2 along an axis A1, back and forth, or to and fro, across part or all of the vehicle path VP and generally transversely or perpendicular to the longitudinal axis LA. This movement can occur as the motor moves the mitter frame and/or the curtain in one or more paths that are transverse to the longitudinal axis. In some applications, the motor can move the mitter frame and curtain to and fro, linearly and laterally, back and forth across and/or transverse to the axis, and in others, in an elliptical, round and/or curved path back and forth across and/or transverse to the axis. When this movement occurs, the individual mitters 40 of the mitter curtain 30C can translate in a swaying motion, generally swaying to and fro across the vertical path, in first and second lateral directions. Although described as lateral directions, these first and second directions can be somewhat curved paths in some cases, and linear paths in others. Optionally, the mitter curtain overlaps the vehicle pathway VP substantially, extending across a majority of the vehicle path width VPW. In some cases, the mitter curtain width 30CW can extend across at least 80%, at least 90%, at least 95% and/or 100% of the vehicle path width VPW so as to engage multiple surfaces of the vehicle.

Further optionally, as shown in FIG. 2, the mitter curtain 30C can include multiple individual mitters 40 that extend outwardly from the mitter frame 30F. These individual mitters 40 can be constructed in accordance with a current embodiment. There may however, be additional secondary mitters 30M that also extend downward from the frame 30F. These secondary mitters 30M can be constructed from a long flexible sheets, panels or strips of cloth, fabric or other material. The cloth optionally can include microfibers, or minute small fibers or loops that extend out from surfaces of the secondary mitters 30M. The secondary mitters 30M optionally can be of a lesser thickness than the individual mitters 40 as described below. The secondary mitters 30M also can be displaced laterally outside a central region CR of the vehicle path VP. The central region optionally can be that region along the vehicle path that allows the vehicle to be engaged at its rear window, over a wiper there. Thus, the secondary mitters 30M, which do not include the first thickness T1 as described below, can be disposed outside that central region CR so that they do not directly engage the rear window and/or wiper of the vehicle that passes through the mitter apparatus 10.

The secondary mitters 30M can be constructed differently from the individual mitters 40 as described below. In particular, the mitters 30M can be the form of a sheath having panels folded over one another without an elongated pad inside the mitters 30M. Thus, the thickness of these secondary mitters 30M comprises the thicknesses of the panels that make up the sheath, with no internal pad. Optionally, tertiary mitters 30T also can be included at a height H1 above the tracks 21T in the vertical path EP. These tertiary mitters 30T can be of a similar configuration as the secondary mitters 30M, including no internal pad. The height H1 can be sufficient so that the tertiary mitters 30T will not engage a wiper located on a rear surface, such as a rear window, of a vehicle.

Figure 7:
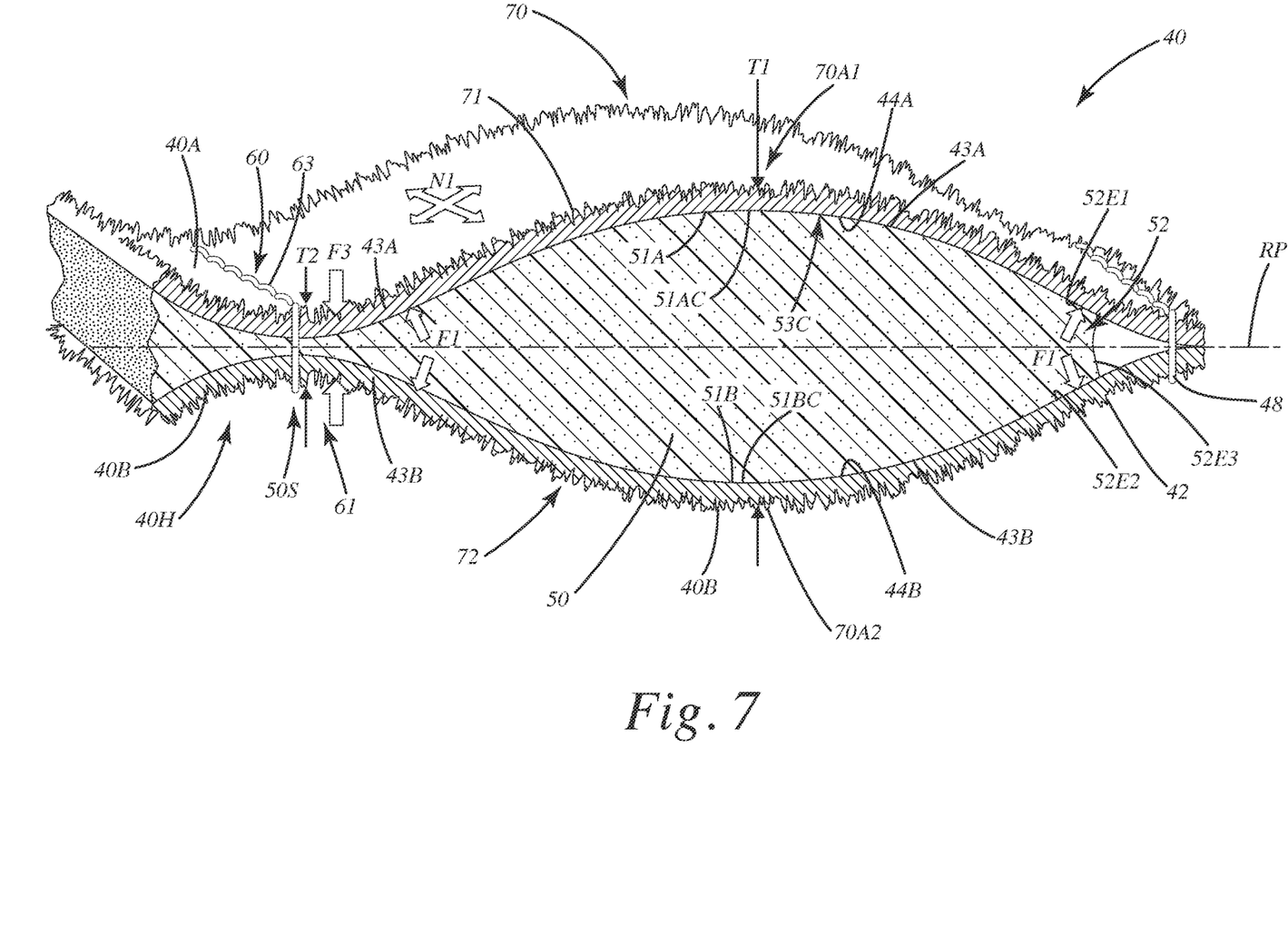
FIG. 7 is a section view of the individual mitter with a continuous pad disposed therein exerting forces on a sheath of the mitter.

With reference to FIGS. 5-7, the structure of the individual mitters 40 of the mitter apparatus will now be described in further detail. As mentioned above, the mitter 40 can include an elongated flexible sheath 43. This sheath 43 can be formed from a sheet of flexible cloth, optionally an elongated sheet of microfiber cloth having a plurality of microfibers extending therefrom. The sheet can be folded over on itself and sewn closed along a longitudinal seam 45S that is generally parallel to the longitudinal axis LA of the mitter 40. This seam can include multiple individual stitches of thread, filament or other elongated material. Although shown as being sewn together, the seam 45S can be formed by fusing, melting, cementing, gluing and/or bonding together edges of the sheet. In other cases, two elongated individual strips of cloth material or other flexible material can be sewn together at the opposing edges to form the sheath 43. The sheath is constructed so that it defines an interior tube 44 as shown in FIG. 6. The lower end 42 of the sheath 43 can be sewn closed with a seam 48 which can form a portion of the longitudinal seam 45S. The interior tube 44 can include a first interior surface 44A and a second interior surface 44B that generally face one another inside the sheet and tube.

As shown in FIG. 6, the mitter 40 can include an elongated pad 50. The elongated pad can be constructed from a resilient, flexible and/or compressible material. The elongated pad is configured to be disposed in the interior tube 44, concealed inside the sheath 43. When installed, the elongated pad 50 can press outward on the sheath and the tube, generally engaging the first interior surface 44A and second interior surface 44B. When the elongated pad 50 presses outward on the sheath, the sheath attains a first thickness T1 between a first surface 40A and a second surface 40B, which can be outer or exterior surfaces of the sheath on opposing sides thereof.

Optionally, the first thickness T1 can be greater than the thickness of the panels 43A and 43B that form the sides of the sheath when placed atop one another. Further optionally the first thickness can be at least ½ inch, at least ¾ inch, at least 1 inch, at least ½ inch, at least 1¾ inch, at least 2 inches, at least 2½ inches, at least 3 inches, between about ½ inch and about 2 inches, or between about 1 inch and about 3 inches. These first thicknesses T1 can be selected so that they are less than a thickness TC as shown in FIG. 4, which can correspond to the thickness between an outer portion of the wiper blade W and/or an overall thickness or height of a wiper blade on the wiper W. This thickness T1 can be sufficient so that the mitter 40 is impaired from entering the interface I between the wiper W and the rear window RW, or other vehicle surface.

As shown in FIG. 6, the elongated pad 50 initially can be in the form of an elongated rectangular strip of foam or other compressible material. The pad 50 can have an initial thickness T1+. This initial thickness T1+ optionally can be equal to or slightly greater than the first thickness T1. In some cases, the pad can be in the form of a continuous foam pad and can have a thickness of optionally about ½ inch to about 3½ inches, about 1 inch to about 3 inches, or about 1 inch to about 2 inches. Other initial thicknesses can be selected for the elongated pad. The elongated pad can include a first pad end 51 and a second pad end 52. The first pad end can be disposed above the second end 52 when the pad 50 is installed in a hanging mitter 40. The first pad end 51, when installed fully in the sheath 43 can be disposed a distance D2 away from the first end 41 of the sheath. This distance D2 can be optionally at least 1 foot, at least 2 feet, at least 3 feet, at least 4 feet, at least 5 feet or other distances depending on the overall length of the sheath. Optionally, as shown in FIG. 6, when the first pad 50 is installed in the sheath 43, the sheath has no elongated pad inside the interior tube 44 between the first pad end 51 and the first end 41 of the sheath 43. In turn, this portion can form a padless region 47 of the mitter 40. In this padless region 47, there generally is no pad that adds substantially to the thickness and/or rigidity of the sheath or mitter.

Where the sheath 43 includes a padless region 47 above the elongated pad 50, the first interior surface 44A and second interior surface 44B can face one another, and in many cases can contact one another, generally above the first end 51 of the elongated pad 50. Of course, where there are wrinkles in the respective first and second panels 43A and 43B, the respective interior surfaces might not touch one another, and might be spaced with a small void between one another. In the region of the sheath where the elongated pad 50 is located however, the elongated pad 50 can be sandwiched between the first interior surface 44A and the second interior surface 44B such that the first surface 51A of the elongated pad contacts the first interior surface 44A, and the second surface 51B of the elongated pad contacts the second interior surface 44A.

Optionally, when the elongated pad 50 is disposed in the sheath, and the first interior surface and second interior surface engage the respective pad surfaces, the respective panels 43A and 43B and surfaces exert a force on the elongated pad 50 and directly on the respective surfaces 51A and 51B where the pad is located inside the interior tube. In this case, at least a portion of the elongated pad is compressed such that its initial thickness T1+ decreases to a first thickness T1 or some other thickness depending on the construction. The elongated pad also exerts a counterforce, generally pressing outward on the sheath and the panels, so that the sheath attains the first thickness T1 between the first and second surfaces 40A and 40B. The sheath and the respective panels also can be stretched taut or generally placed under tension over the elongated pad 50. This tension or force is illustrated generally as N1 in FIG. 6. The force can be parallel and/or perpendicular to the longitudinal axis LA, or transverse to the longitudinal axis LA, depending on the initial dimensions of the sheath 43 and the elongated pad 50.

As shown in FIG. 6, the elongated pad 50 can include various edges that are bent flexed and/or curved when the elongated pad is loaded into the interior tube and the sheath. For example, the second end 52 can include edges 52E1 and 52E2. These edges can be connected together via another edge 52E3. The edges 52E1 and 52E2 can be generally parallel to one another and perpendicular to the edge 52E3 before the pad 50 is installed in the sheath.

After the pad 50 is installed in the sheath and the mitter, these edges can translate and move relative to one another. For example, as shown in FIG. 7, when the sheath and panels 43A and 43B compress the elongated pad 50 near the second end 52 of the elongated pad, the pad is compressed and exerts a corresponding reactive force F1 on those panels in the sheath. The edges 52E1 and 52E2 can curve toward one another as shown in FIG. 7, and generally toward a reference plane RP that bisects the pad, sheath and mitter general. The edges 52E1, 52E2 are no longer parallel to one another in this configuration, but rather converge toward the reference plane RP. In turn, the edges 52E1 and 52E2 are closer to one another when the pad is installed in the sheath and/or mitter, than when the pad is outside the sheath before installation. The other edge 52E3 also can crumple, deform and/or bend due to the forces exerted by the sheath and reaction of the forces F1 exerted by the pad against the panels of the sheath.

Optionally, the pad 50 can take on a curvilinear arch or arced shape 53C and 53D above and below the reference plane RP when a seam 60 is included in the sheath as described below. This arch shape 53C and 53D of the pad can form opposing convex structures of the pad and sheath on the first surface 51A and second surface 51B of the pad. Further optionally, in other constructions, the shapes 53C and 53D can be more polygonal, square or triangular in some cases. The corresponding sheath portions and parts of the panels that extend over the compressed pad can be stretched to form multiple bulges 70 along the length of the mitter 40 as described below. Optionally, the foam pad first surface 51A can include a first surface central portion 51AC. The second surface 51B can include a second surface central portion 51BC. The lower pad end 52 can be compressed by the sheath and the panels. When this occurs, the first edge 52E1 and 52E2 can be closer to one another than the first surface central portion 51AC and the second surface central portion 51BC. In some cases, the edges 52E1 and 52E2 can be optionally at least ¼ inch, at least ½ inch, at least ¾ inch closer to one another than the central portions 51AC and 51BC. Of course these distances can change depending on the application.

As further shown in FIG. 7, the first surface 51A of the elongated pad 50 can be curved between the central portion 51AC and the edge 52E1 and/or the edge 52E3. Likewise the second surface 51B of the elongated pad 50 can be curved between the central portion 51BC and the edge 52E2 and/or the edge 52E3. In these regions, the surfaces 51A and 51B can curve or angle toward the reference plane RP as they extend toward the second or lower end 52.

Optionally, the elongated pad can add rigidity to the sheath 43 near the second end 42 of the pad and upwardly therefrom. This rigidity can function to prevent the mitter from folding over on itself and/or becoming of a diminished thickness such that it can fit between the interface I of the wiper W and the vehicle surface RW against which the wiper is disposed. Where the pad is not included in the sheath, for example, in the padless region 47, that portion of the sheath and mitter can be more flexible. This portion of the mitter can be disposed at a location higher on the mitter and closer to the first end, nearer to the mitter frame 30F. Optionally this padless region can be disposed above the height H1 from the vertical path VP or at a height that is generally above the majority of wipers on conventional vehicles.

Returning to FIG. 5, the sheath 43 includes the longitudinal axis LA that extends vertically upward from a second or lower end 42 toward a first or upper end 41 of the mitter 40. The sheath 43 optionally can include multiple seams 60 transverse to the longitudinal axis LA. At the seams 60, the sheath can include a second thickness T2. This second thickness T2 can be less than the first thickness T1. In some cases, the second thickness T2 optionally can be less than ¾ T1, less than ⅔ T1, less than ½ T1, or less than ⅓ T1. The seam 60 itself can be formed optionally with one or more stitches, which can be in the form of thread, filament, fibers or other elongated components that are stitched, sewn or otherwise placed through the panels 43A, 43B of the sheath 43, optionally as well as the elongated pad 50 in these regions. In alternative constructions, the seam 60 can be formed via fusing, melting, cementing, or otherwise joining the panels to one another.

Where the seams are included in the sheath 43, the mitter 40 can include one or more bulges 70 which can extend from both the first surface 40A and the second surface 40B, generally in opposite directions from one another relative to the reference plane RP as shown for the FIG. 7. These bulges 70 can be in the form of curvilinear and/or angular bulges that extend convexly outward from the reference plane RP of the mitter 40. The mitter can be constructed so that the each respective bulge, when in the form of a curvilinear bulge, can include an apex. For example, the exterior surface of the sheath can form or include a first bulge 71 along the first surface 40A, while the exterior surface can form a second bulge 72 along the second surface 40B. These first and second bulges 71, 72 can extend opposite directions, away from the central reference plane RP to form convex bulges away from that reference plane.

The first bulge 71 on one side of the reference plane optionally can include a first apex 70A1. The second bulge 72 on the opposite side of a reference plane form a second apex 70A2. The first thickness T1 of the sheath 43 can be defined between these first and second apexes of the respective first and second bulges. Generally, the thickness between the respective apexes can be the greatest thickness along the portion of the mitter between adjacent seams 60. In the region of the respective first and second bulges 71, 72, the sheath and the respective panels 43A, 43B of fabric, cloth or other material can be stretched taut in multiple directions N1, optionally due to the interaction of the sheath with the internal elongated pad that pushes outward on the sheath and the respective panels.

Where the seams 60 include stitches 63, the stitches can compress the sheath and/or the elongated pad. For example, the stitches 63 can extend through the first surface 40A, first panel 43A, through the elongated pad 50 as well as the second panel 43B, second surface 40B of the mitter 40. Due to the stitches, the elongated pad is compressed by a compression force F3 exerted by the stitching. The respective surfaces 40A and 40B also are brought closer to one another. As a result, the stitches can form the seam 60, which in turn can have a second thickness T2 that is less than the first thickness T1. Of course, in some applications, the seam can be formed by loose stitching such that the elongated pad 50 is not compressed substantially in the seam region 50S of the pad. In this case, the second thickness T2 might not be significantly less than the first thickness T1 and in some cases can be equal to the thickness T1. In such a case, the seam 60 might not form any notable bulges along the exterior surfaces of the sheath and mitter.

Optionally, and the location of the seam 60, the elongated pad 50 and the exterior surfaces 40A and 40B can form an hourglass shape 40H. This hourglass shape can correspond to the portions of the elongated pad 50 that are compressed or squeezed by the seam and optionally the stitches 63 at the seam. Although shown as a single line of stitches 63, additional stitching can be included, depending on the application. Over the length of a mitter 40, there can be multiple hourglass shapes formed at the respective seams 60. There also can be multiple individual curvilinear bulges extending from opposite sides of the mitter when the seams are included.

Figure 8:
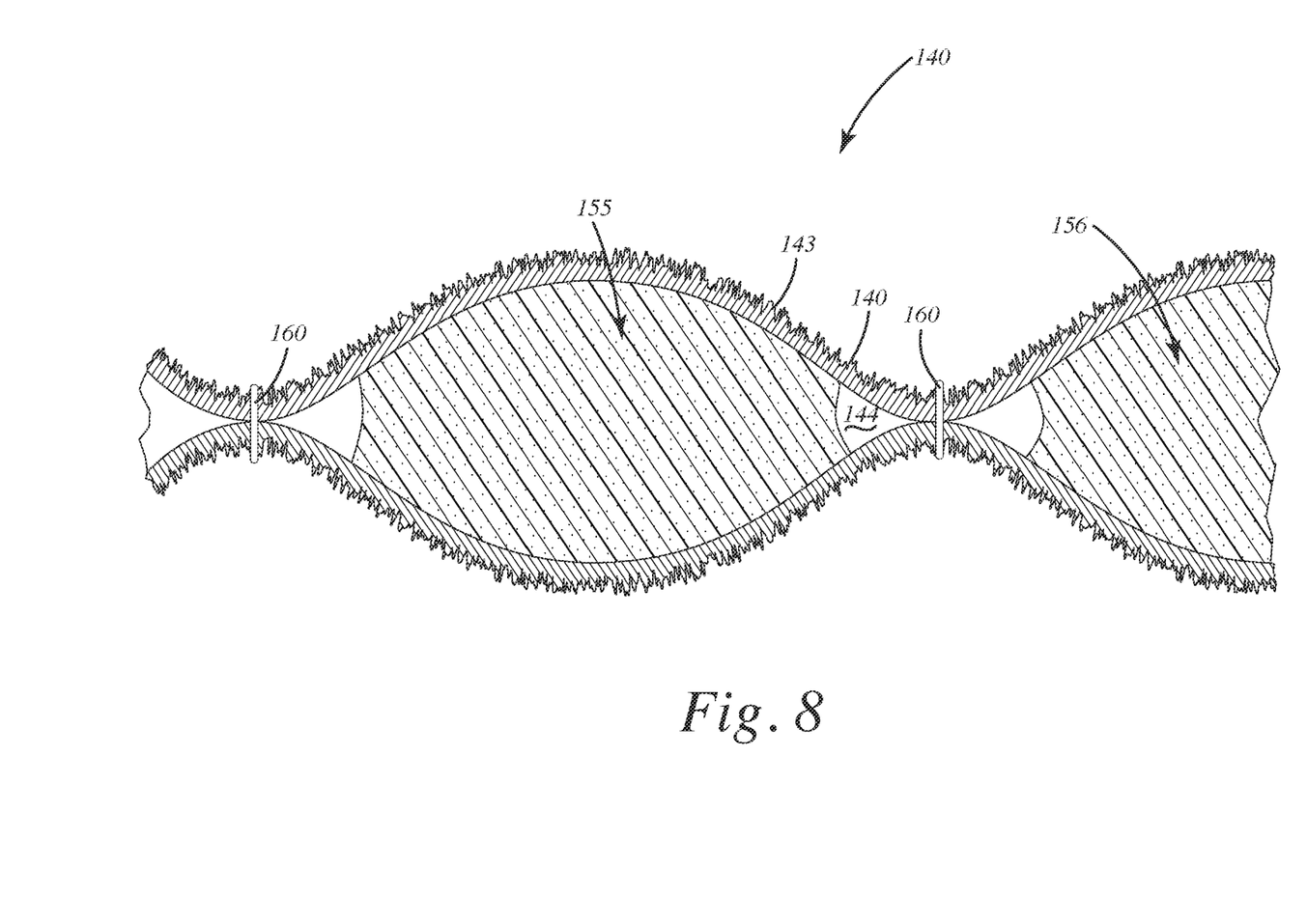
FIG. 8 is a section view of the individual mitter of an alternative embodiment with pad segments disposed therein exerting forces on a sheath of the mitter.

Although the elongated pad 50 is described as a continuous elongated pad, in some applications, the pad can be formed from multiple individual pad segments. For example, FIG. 8 shows a first alternative embodiment of a mitter 140. There, the mitter 140 includes a sheath 143 with opposing panels 143A and 143B, which are stitched to one another at respective seams 160. The elongated pad, however, is constructed in the form of multiple independent segments 155, 156, for example, which are disposed within the interior tube 144 of the sheath 143. These segments can be separated from one another by the seams 160. Further, these segments might not be under much compression at their respective ends when compared to the continuous elongated pad 50 of the embodiment above.

A method of using the vehicle wash mitter apparatus 10 of the current embodiments will now be described with reference to FIGS. 1-4. In general, the method can include: providing a mitter curtain including a plurality of mitters, each mitter comprising a sheath defining an interior tube, an exterior surface and a pad inside the interior tube, the sheath exerting a compressive force on the pad inside the interior tube, with the sheath having a first thickness between a first surface and a second surface; swaying the mitter curtain transversely across and above the vehicle pathway such that a downward extending mitter engages a rear window of a vehicle adjacent a wiper of the vehicle, the wiper in contact with the rear window, the mitter moving along an interface between the wiper and the rear window, the first thickness being too great for the mitter to breach the interface and urge the wiper out of contact with the rear window as the mitter moves, whereby damage to the wiper of the vehicle is prevented when the mitter curtain engages the rear window and the wiper as the vehicle travels along the vehicle pathway.

In the method, with reference to FIG. 1, the mitter curtain 30C including individual mitters 40 can be supported on a mitter frame 30F. The frame 30F is moved to and fro, in opposing, generally lateral directions L1 and L2, which may be linear and/or curved, transversely across and above the vehicle path VP. As the vehicle V moves under the mitter curtain 30C, the individual mitters 40 sway back and forth transversely relative to the vehicle surfaces. The individual mitters, as mentioned above, dangle vertically downward from the support frame 20 and the mitter frame 30F. The mitters thus can engage a hood, fenders, a roof, side surfaces, windows and a rear surface of the vehicle, which optionally can include a rear window RW and a wiper W. As the mitters engage the surfaces, the surfaces 40A and 40B of the mitter 40 can directly engage and travel over those components of the vehicle.

As noted above, the mitters 40 can dangle downward and directly engage a rear window RW and/or wiper W of the vehicle V as it sufficiently passes the mitter curtain and apparatus 10 in general. As shown in FIG. 3, the mitters 40 engage the rear window RW and the wiper W of the vehicle V. If there are secondary mitters 30M and tertiary mitters 30T, these mitters might not engage the rear window and/or wiper because they are disposed above and/or laterally relative to the rear window RW. As shown in FIG. 4, as the mitter 40 engages the rear window RW adjacent the wiper W, the wiper typically is in direct contact with the rear window. At this point of contact along the wiper blade, an interface I exists between the wiper and the rear window. The mitter of the current embodiment, however, has a first thickness T1 that is too great for the mitter to breach the interface I and urge the wiper W out of contact with the rear window RW as the mitter 40 moves and sways back and forth across the window or otherwise moves relative to the window.

The first thickness T1 of the mitter 40 also is great enough so that the mitter does not extend into the crevice VC between the portion of the wiper W and the rear window RW. As a result, the mitter does not extend or enter between the rear window and in the wiper. Accordingly, the mitters of the mitter curtain will not substantially move, pull on and/or damage the wiper W as the mitters engage the wiper and the rear window while the vehicle travels along the vehicle pathway.

Where the mitter 40 includes multiple bulges 70 along the length of the sheath, those bulges move over the rear window and the wiper, with the seams between the bulges moving generally parallel to the wiper W. As the mitter moves, the bulges 70 can flex and pivot relative to one another at their respective seams 60 as shown at R1 in FIG. 4. Optionally, the rigidity of the mitter, added optionally by the elongated pad inside the sheath, renders the mitter 40 less flexible so that it is less likely to fold or furl upon itself, or otherwise be pulled into or between the wiper W and the rear window RW.

Directional terms, such as "vertical," "horizontal," "top," "bottom," "upper," "lower," "inner," "inwardly," "outer," and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to," another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to," another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the," or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A wash mitter configured to be placed over a vehicle pathway and dangle downward as the wash mitter moves, the wash mitter comprising:
   a first end configured to join with a mitter frame disposed over a vehicle pathway and a second end disposable distal from the mitter frame and closer to the vehicle pathway than the first end;
   an elongated, flexible sheath defining an interior tube and an exterior surface having microfibers configured to engage a vehicle surface, the elongated flexible sheath configured to dangle vertically downward over the vehicle pathway when joined with the mitter frame at the first end; and
   an elongated pad disposed in the interior tube and concealed inside the sheath, the elongated pad pressing outward on the sheath so that the sheath attains a first thickness between a first surface and a second surface, the sheath exerting a force on the elongated pad inside the interior tube so that at least a portion of the elongated pad is compressed and the sheath is stretched taut over the elongated pad;
   wherein the first thickness is at least one half inch so that the sheath is configured to be operably impaired from entering a space located between a wiper of a vehicle and a vehicle surface adjacent the wiper of the vehicle when the wash mitter sways to and fro across the vehicle pathway,
   whereby damage to the wiper of the vehicle is prevented when the wash mitter engages the vehicle surface and the wiper as the vehicle travels along the vehicle pathway.

2. The wash mitter of claim 1,
   wherein the sheath includes a longitudinal axis,
   wherein the sheath includes a plurality of seams extending transverse to the longitudinal axis.

3. The wash mitter of claim 2,
   wherein the sheath includes a second thickness adjacent the plurality of seams, wherein the second thickness is less than the first thickness.

4. The wash mitter of claim 3,
wherein the exterior surface forms a first curvilinear bulge between a first seam and a second seam of the plurality of seams.

5. The wash mitter of claim 4,
wherein the curvilinear bulge includes an apex,
wherein the first thickness is located at the apex.

6. The wash mitter of claim 1,
wherein the exterior surface forms a first bulge along the first surface,
wherein the exterior surface forms a second bulge along the second surface,
wherein the first bulge and second bulge extend oppositely away from one another.

7. The wash mitter of claim 6,
wherein the first bulge includes a first apex,
wherein the second bulge includes a second apex,
wherein the first thickness is defined between the first apex and the second apex.

8. The wash mitter of claim 1 comprising:
a stitch extending through the first surface, the elongated pad and the second surface of the mitter, to form a seam,
wherein the elongated pad is compressed more at the seam than distal from the seam.

9. The wash mitter of claim 1,
wherein the elongated pad extends upward from the second end in the interior tube and terminates at a first pad end,
wherein the first pad end is disposed at least two feet away from the first end of the sheath,
wherein the sheath has no elongated pad inside the interior tube between the first pad end and the first end of the sheath, in a padless region.

10. The wash mitter of claim 1,
wherein the elongated pad includes a plurality of independent foam segments distributed along a length of the sheath extending away from the second end.

11. The wash mitter of claim 1,
wherein the elongated pad is a continuous foam pad extending along a length of the sheath away from the second end,
wherein the continuous foam pad has a thickness of about 1 inch to about 3 inches.

12. A wash mitter configured to be placed over a vehicle pathway and dangle downward as the wash mitter moves, the wash mitter comprising:
a first end and a second end distal from the first end and configured to be closer to the vehicle pathway than the first end when installed over the vehicle pathway;
a sheath defining an interior tube and an exterior surface configured to engage a vehicle surface;
a pad inside the sheath, the pad pressing outward on the sheath so that the sheath attains a first thickness between a first surface and a second surface, the sheath exerting a force on the pad inside the interior tube so that at least a portion of the pad is compressed and the sheath is stretched taut over the pad;
wherein the first thickness is at least one half inch so that the sheath is configured to be operably impaired from entering a space located between a wiper of a vehicle and the vehicle surface which the wash mitter engages.

13. The wash mitter of claim 12,
wherein the pad is a foam pad having a lower pad end and an upper pad end,
wherein the foam pad includes a first surface and an opposing second surface, the first surface having a first surface central portion and terminating at a first edge at the lower pad end, and the second surface having a second surface central portion and terminating at a second edge at the lower pad end,
wherein the lower pad end is compressed by the sheath so that the first edge and the second edge are closer to one another than the first surface central portion and the second surface central portion.

14. The wash mitter of claim 13,
wherein the first surface is curved between the first surface central portion and the first edge,
wherein the second surface is curved between the second surface central portion and the second edge.

15. The wash mitter of claim 12,
wherein the interior tube includes a first interior surface and a second interior surface facing one another,
wherein the elongated pad is sandwiched between the first interior surface and the second interior surface such that the first surface of the elongated pad contacts the first interior surface and the second surface of the elongated pad contacts the second interior surface,
wherein the first interior surface and the second interior surface engage one another in a padless region.

16. The wash mitter of claim 12,
wherein the sheath includes a plurality of seams transverse to a longitudinal axis of the sheath,
wherein the elongated pad is compressed more adjacent the seams.

17. A wash mitter configured to be placed over a vehicle pathway and dangle downward as the wash mitter moves, the wash mitter comprising:
a sheath defining an interior tube and having an exterior surface;
a pad inside the interior tube engaging the interior surface, the sheath exerting a compressive force on the pad inside the interior tube, the sheath having a first thickness between a first surface and a second surface, the sheath including a padless region above the pad, the padless region having a length of at least two feet,
wherein the wash mitter is installable over a vehicle pathway such that the wash mitter extends vertically downward under a force of gravity with the pad below the padless region, the wash mitter being able to be engaged with a rear window of a vehicle adjacent a wiper of the vehicle, the wiper in contact with the rear window, the wash mitter arrangeable to move along an interface between the wiper and the rear window, the first thickness being too great for the mitter to breach the interface and urge the wiper out of contact with the rear window as the mitter moves,
whereby damage to the wiper of the vehicle is prevented when the wash mitter engages the rear window and the wiper as the vehicle travels along the vehicle pathway.

18. The wash mitter of claim 17,
wherein the first thickness is at least one inch,
wherein the pad presses outward on the sheath so the sheath is stretched taut over the pad.

19. The wash mitter of claim 17,
wherein the sheath includes a plurality of seams transverse to a longitudinal axis of the sheath,
wherein the elongated pad is compressed more adjacent the seams so that a plurality of bulges is formed along the sheath.

20. The wash mitter of claim 17,
wherein the sheath includes a plurality of seams,
wherein the sheath includes a second thickness that is less than one half the first thickness along the seam,
wherein the sheath forms opposing bulges as the sheath extends away from the seam.

\* \* \* \* \*